(12) United States Patent
Yamashita et al.

(10) Patent No.: US 10,293,435 B2
(45) Date of Patent: May 21, 2019

(54) PRESSURE-SENSITIVE ADHESIVE FILM

(71) Applicants: NITTO DENKO CORPORATION, Ibaraki-shi, Osaka (JP); NITTO EUROPE N.V., Eikelaarstraat, Genk (BE)

(72) Inventors: Kenta Yamashita, Ibaraki (JP); Mitsushi Yamamoto, Ibaraki (JP); Donald Pinxten, Genk (BE); Bert Cryns, Genk (BE)

(73) Assignees: NITTO DENKO CORPORATION, Ibaraki-shi, Osaka (JP); NITTO EUROPE N.V., Eikelaarstraat, Genk (BE)

( * ) Notice: Subject to any disclaimer, the term of this patent is extended or adjusted under 35 U.S.C. 154(b) by 217 days.

(21) Appl. No.: 15/051,771

(22) Filed: Feb. 24, 2016

(65) Prior Publication Data

US 2016/0168426 A1 Jun. 16, 2016

Related U.S. Application Data

(62) Division of application No. 13/924,991, filed on Jun. 24, 2013, now Pat. No. 9,302,344.

(30) Foreign Application Priority Data

Jun. 25, 2012 (JP) .................... 2012-141996

(51) Int. Cl.
*B32B 27/08* (2006.01)
*B32B 27/36* (2006.01)
(Continued)

(52) U.S. Cl.
CPC ............ *B23K 26/38* (2013.01); *B23K 26/009* (2013.01); *B23K 26/18* (2013.01); *B23K 26/36* (2013.01);
(Continued)

(58) Field of Classification Search
CPC .......... C09J 7/0296; C09J 7/29; B23K 26/009
See application file for complete search history.

(56) References Cited

U.S. PATENT DOCUMENTS

2005/0233547 A1* 10/2005 Noda .................... B32B 43/006
438/459
2006/0246279 A1 11/2006 Urairi et al.
(Continued)

FOREIGN PATENT DOCUMENTS

CN 1957053 A 5/2007
CN 101058700 A 10/2007
(Continued)

OTHER PUBLICATIONS

Translation of JP 2007-284551, see IDS filed Nov. 23, 2016 for date and inventor.*

(Continued)

*Primary Examiner* — Victor S Chang
(74) *Attorney, Agent, or Firm* — Sughrue Mion, PLLC

(57) ABSTRACT

The pressure-sensitive adhesive film according to the present invention comprises a resin film as a substrate and a pressure-sensitive adhesive layer provided at least on a face of the resin film. The resin film has a multi-layer constitution consisting of at least two layers. The resin film has a laser beam reflectance of 5% or higher, but 40% or lower in a wavelength range of 1000 nm to 1100 nm, and has a laser beam transmittance of 5% or lower in the said wavelength range.

18 Claims, 2 Drawing Sheets

(51) Int. Cl.
   *C09J 7/29*    (2018.01)
   *B23K 26/38*   (2014.01)
   *B23K 26/18*   (2006.01)
   *B23K 26/00*   (2014.01)
   *B23K 26/36*   (2014.01)
   *B32B 27/20*   (2006.01)
   *B32B 27/32*   (2006.01)
   *C08K 3/04*    (2006.01)
   *C09J 107/00*  (2006.01)
   *C08K 3/013*   (2018.01)

(52) U.S. Cl.
   CPC .............. *B32B 27/08* (2013.01); *B32B 27/20* (2013.01); *B32B 27/32* (2013.01); *B32B 27/36* (2013.01); *C09J 7/29* (2018.01); *B32B 2405/00* (2013.01); *C08K 3/013* (2018.01); *C08K 3/04* (2013.01); *C09J 107/00* (2013.01); *C09J 2201/162* (2013.01); *C09J 2201/606* (2013.01); *C09J 2205/106* (2013.01); *C09J 2205/31* (2013.01); *C09J 2423/046* (2013.01); *Y10T 428/2848* (2015.01)

(56) References Cited

U.S. PATENT DOCUMENTS

| | | |
|---|---|---|
| 2007/0243341 A1 | 10/2007 | Yokoyama et al. |
| 2008/0014407 A1 | 1/2008 | Katoh et al. |
| 2012/0015114 A1 | 1/2012 | Yokoyama et al. |
| 2012/0018903 A1 | 1/2012 | Takamoto et al. |
| 2013/0040100 A1 | 2/2013 | Morioka et al. |

FOREIGN PATENT DOCUMENTS

| | | | |
|---|---|---|---|
| EP | 1 184 437 A2 | 3/2002 | |
| JP | 3-146285 A | 6/1991 | |
| JP | 2002343747 A | * 11/2002 | ......... H01L 21/6836 |
| JP | 2004-235194 A | 8/2004 | |
| JP | 2005-343908 A | 12/2005 | |
| JP | 2007-284551 A | 11/2007 | |
| JP | 2011-207949 A | 10/2011 | |
| WO | 2011/122437 A1 | 10/2011 | |

OTHER PUBLICATIONS

English translation of JP 202-343747.*
Notification of Reasons for Refusal dated Sep. 8, 2016 from the Japanese Patent Office in counterpart Application No. 2012-141996.
Communication dated Dec. 13, 2017 from the European Patent Office in counterpart Application No. 13 173 636.5.
First Notification of Reasons for Refusal dated Dec. 4, 2015 from the State Intellectual Property Office of the People's Republic of China in counterpart application No. 201310256379.8.
European Search Report issued in corresponding EP Application No. 13173636.5, dated Jul. 26, 2013.
Notification of Reasons for Refusal dated Feb. 18, 2016, issued by the Japan Patent Office in corresponding Japanese Application No. 2012-141996.
Third Notification of Reasons for Refusal dated Dec. 14, 2016, from the State Intellectual Property Office of the People's Republic of China in corresponding Chinese Application No. 201310256379.8.
Extended European Search Report dated Mar. 9, 2017, from the European Patent Office in counterpart European application No. 13173636.5.
Second Notice of Reasons for Refusal dated Jun. 6, 2016, from the State Intellectual Property Office of People's Republic of China in counterpart Application No. 201310256379.8.
Communication dated Nov. 2, 2018 from the European Patent Office in counterpart Application No. 13 173 636.5.

* cited by examiner

[Fig. 1]
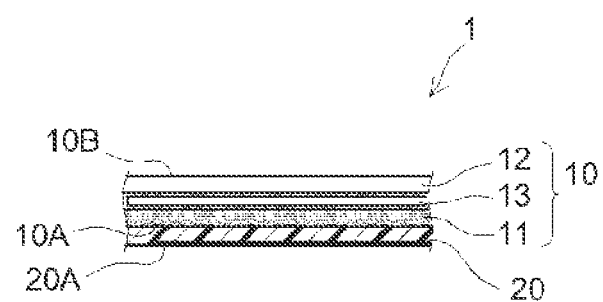
[Fig. 2]
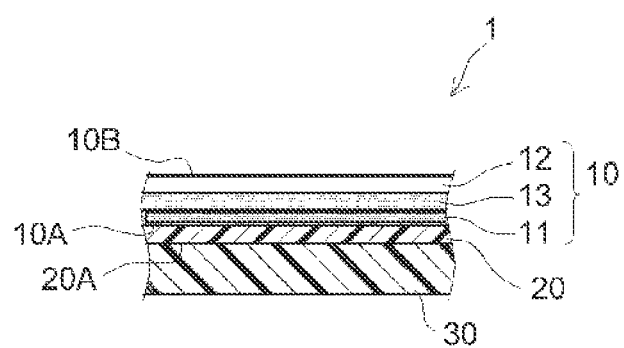

[Fig. 3]
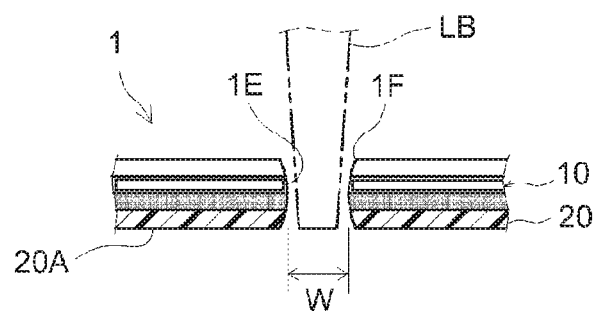
[Fig. 4]
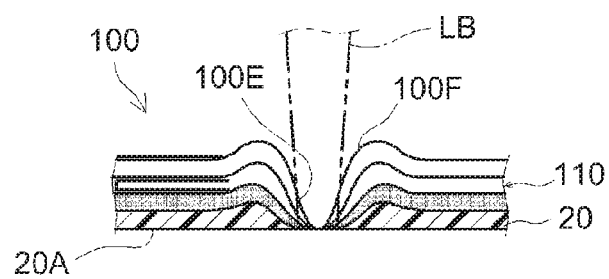

PRESSURE-SENSITIVE ADHESIVE FILM

CROSS-REFERENCE

This is a divisional application of U.S. application Ser. No. 13/924,991 filed Jun. 24, 2013, which claims priority based on Japanese Patent Application No. 2012-141996 filed on Jun. 25, 2012, and the entire contents thereof are incorporated herein by reference.

BACKGROUND OF THE INVENTION

1. Field of the Invention

The present invention relates to a pressure-sensitive adhesive (PSA) film, in particular, a PSA film preferably used for applications that involve cutting with a laser beam in a specific wavelength range.

2. Description of the Related Art

Techniques involving laser beam machining have been widely used for cutting and hole-making, etc., of various materials. Carbon dioxide laser is a typical example of a laser used for such machining processes. For instance, in an embodiment of such laser machining, a PSA film as an auxiliary material is adhered to a surface of a work piece and a laser beam is projected onto the PSA film, whereby the work piece along with the PSA film is processed with the laser. For example, Japanese Patent Application Publication No. 2004-235194 discloses a technique to increase hole-making reliability or workability, etc., by pressure-bonding an auxiliary PSA sheet to a copper-clad board and projecting a carbon dioxide laser onto the auxiliary PSA sheet to make holes in the copper-clad board.

SUMMARY OF THE INVENTION

Recently, with respect to laser machining as described above, there is growing interest in machining techniques using a short-wavelength laser beam. For example, in place of a carbon dioxide laser (with a center wavelength of about 9.3 μm to 10.6 μm), there is a demand for laser machining using a short-wavelength laser having a center wavelength of about 1.0 μm to 1.1 μm. In laser machining using such a short-wavelength laser beam, however, use of a PSA film in the same way as it had been used for carbon dioxide laser machining sometimes failed to make a high-quality cut in the PSA film and resulted in decreased efficiency or accuracy in the laser machining.

The present invention has been made in view of such circumstances with an objective to provide a PSA film suitable for applications where the PSA film is cut with a short-wavelength laser having a center wavelength of 1.0 μm to 1.1 μm. It is noted that unlike laser abrasion, the laser beam machining technique disclosed herein relates to an ordinary laser machining such as cutting with a YAG laser having a longer pulse duration (more particularly, having a continuous output of the order of microseconds), or the like.

The present invention provides a PSA film comprising a resin film as a substrate and a PSA layer provided at least on a face (typically, at least on one of two faces) of the resin film. The resin film in the PSA film has a multi-layer constitution consisting of at least two layers. The resin film has a laser beam reflectance of 5% or higher, but 40% or lower in a wavelength range of 1000 nm to 1100 nm. It also has a laser beam transmittance of 5% or lower in the said wavelength range.

The PSA film has a laser beam reflectance of 5% or higher, but 40% or lower in the wavelength range of 1000 nm to 1100 nm (or the "prescribed wavelength range" hereinafter) while having a laser beam transmittance of 5% or lower. This gives rise to a laser beam absorbance of 55 to 95% in the wavelength range, allowing the PSA film to efficiently absorb a laser beam (or a "prescribed laser beam" hereinafter) that has a center wavelengths in the prescribed wavelength range. Thus, using the energy of the absorbed prescribed laser beam, the PSA film can be effectively cut. This cutting may indicate cutting the PSA film by causing a local part of the PSA film to decompose and disappear or to melt down by projecting the prescribed laser beam thereto. Since the resin film has a multi-layer constitution consisting of two or more layers, different properties may be given to the respective layers according to their usage. While not particularly limited, examples of such properties include laser beam cuttability, surface printability, weathering resistance, and distinctiveness. The laser beam cuttability refers to the ease of cutting with the prescribed laser beam and shows certain proportionality to the absorbance of the prescribed laser beam. The surface printability may refer to the ease of printing on the resin film or the visual appearance of prints.

In a preferable embodiment of the PSA film disclosed herein, the front face and the back face of the resin film have different values of lightness L* defined by the L*a*b* color space. With the front face and the back face of the resin film having different lightness, for example, while attaining adequate laser beam cuttability with the prescribed laser beam in a first layer, a second layer may be provided with properties (e.g., designability, surface printability, weathering resistance, distinctiveness, etc.) attainable by the difference in the lightness.

In a preferable embodiment of the PSA film disclosed herein, the resin film comprises a first layer forming a front face of the resin film, with the first layer comprising a carbon black as a laser beam-absorbing agent. Inclusion of a carbon black in the first layer allows preferable cutting of the PSA film with a prescribed laser beam.

In a preferable embodiment of the PSA film disclosed herein, the resin film has a tri-layer constitution. The tri-layer constitution of the PSA film is preferable in producing the effect of the present invention.

In a preferable embodiment of the PSA film disclosed herein, the PSA layer is provided on the front face of the resin film, with the front face of the resin film having a lightness L* defined by the L*a*b* color space of 25 or lower and the back face of the resin film having a L*a*b* color space-defined lightness L* of 65 or higher. Such a constitution allows easy laser beam cutting of the PSA film while providing great designability, surface printability, weathering resistance, and distinctiveness.

In a preferable embodiment of the PSA film disclosed herein, each layer constituting the resin film comprises a resin component, with the resin component being a polyolefin resin or a polyester resin. Here, the term "polyolefin resin" refers to a resin comprising a polyolefin at 50% by mass or greater (e.g., 70% by mass or greater, typically 80% by mass or greater) of the polymer components constituting the resin. Similarly, the term "polyester resin" refers to a resin comprising a polyester at 50% by mass or greater (e.g., 70% by mass or greater, typically 80% by mass or greater) of the polymer components constituting the resin. A resin film constituted with a layer containing such a resin and a PSA film comprising the resin film are preferable because when cut with the prescribed laser beam, the cut width can be easily controlled while being likely to form a cut edge having a precisely shaped surface.

A preferable embodiment of the PSA film disclosed herein is used in an application involving cutting with a laser beam having a center wavelength of 1000 nm to 1100 nm. The PSA film disclosed herein has properties suitable for use in an embodiment comprising being cut with a laser beam having a center wavelength of 1000 nm to 1100 nm as described above. In other words, the PSA film is preferably used for applications where it may be cut with the prescribed laser beam.

BRIEF DESCRIPTION OF THE DRAWINGS

FIG. 1 shows a cross-sectional view schematically illustrating a constitutional example of the PSA film.

FIG. 2 shows a cross-sectional view schematically illustrating another constitutional example of the PSA film.

FIG. 3 shows a cross-sectional view schematically illustrating a typical example of a state of the PSA film when cut adequately with a laser beam.

FIG. 4 shows a cross-sectional view schematically illustrating a typical example of a state of the PSA film when cut inadequately with a laser beam.

DETAILED DESCRIPTION OF THE INVENTION

Preferred embodiments of the present invention are described below. Matters necessary to practice this invention other than those specifically referred to in this description may be understood as design matters to a person of ordinary skills in the art based on the conventional art in the pertinent field. The present invention can be practiced based on the contents disclosed in this description and common technical knowledge in the subject field. In the description below, all members and sites providing the same effect are indicated by a common reference numeral, and redundant descriptions may be omitted or simplified.

The PSA film disclosed herein comprises a PSA layer at least on a face of a resin film as a substrate. It may be a single-faced PSA film (an adhesively single-faced PSA film) having a PSA layer only on the first face of the substrate, or it may be a double-faced PSA sheet (an adhesively double-faced PSA film) having a PSA layer on each of the first and second faces of the substrate. Hereinafter, the present invention is described more in detail with a main example being an embodiment where it is applied to a single-faced PSA film while the application of the art disclosed herein is not to be limited to such an embodiment.

FIG. 1 shows a typical constitutional example of the PSA film provided by the present invention. PSA film 1 comprises resin film 10 as a substrate and a PSA layer 20 provided on a first face (single face) 10A thereof, and is used by adhering the PSA layer 20 to an adherend. In a preferable embodiment, the back face 10 B (opposite to the face provided with PSA layer 20) of resin film 10 comprises a releasable surface (release surface). Prior to use (i.e., before adhered to the adherend), PSA film 1 is wound in a roll such that the back face 10B of resin film 10 contacts and protects a surface (adhesive face) 20A of PSA layer 20. Alternatively, as PSA film 1 shown in FIG. 2, the surface 20A of PSA layer 20 may be protected with release liner 30 having a release surface at least on the side facing PSA layer 20 (PSA layer 20 side).

The resin film may have a constitution consisting of at least two layers. Thus, the resin film may comprise at least a first layer and a second layer. In examples shown in FIGS. 1 and 2, resin film 10 has a tri-layer constitution consisting of a first layer 11, a second layer 12, and an intermediate layer 13. The first layer 11 of the resin film 10 is placed on the PSA layer 20 side relative to the second layer 12, forming the PSA layer 20-side surface (or "front face" hereinafter) 10 A in the resin film 10. The second layer 12 is placed on the side of the back face 10B relative to the first layer 11, forming the back face 10B in the resin film 10. The back face 10B may form an outer surface of PSA film 1 when PSA film 1 is adhered to an adherend. The intermediate layer 13 is placed between the first layer 11 and the second layer 12. It is noted that the resin film 10 is not limited to a tri-layer constitution. In view of providing each layer with a different property and the manufacturing, the number of layers is preferably 2 to 5. Thus, an additional layer may be formed between the first layer and the intermediate layer or between the second layer and the intermediate layer. An additional layer may be formed to the front face side relative to the first layer or on the back face side relative to the second layer. Such an additional layer may be provided for a release treatment purpose or to increase the tightness of adhesion, or it may be a layer formed of a printed material. Among these, the resin film preferably has a tri-layer constitution or a four-layer constitution, with a tri-layer constitution being particularly preferable.

Although not particularly limited, the front face and the back face of the resin film are preferably constituted to have different lightness. This ensures the cuttability with the prescribed laser beam while providing the back face with properties such as designability, surface printability, weathering resistance, distinctiveness, and so on. In the present description, the term "lightness" or "lightness L*" refers to the lightness L* specified by the L*a*b* color space based on the definition suggested by the International Commission on Illumination in 1976 or specified by JIS Z8729. In particular, lightness L* can be determined through measurements taken in accordance with the method described later in the worked examples, using a colorimeter (trade name "CR-400" available from Konica Minolta Holdings Inc.; chromameter). The front face and the back face of the resin film differ in the lightness L* by preferably 5 or larger, more preferably 10 or larger, or particularly preferably 20 or larger (e.g., 30 or larger, typically 40 or larger). The difference may be 65 or smaller (e.g., 55 or smaller, typically 45 or smaller).

Although not particularly limited, the back face of the resin film has a lightness L* of suitably 40 or higher (e.g., 45 or higher, typically 55 or higher) or preferably 60 or higher (e.g., 65 or higher, typically 70 or higher). This leads to increased whiteness of the outer surface of the PSA film, providing properties such as designability, surface printability, weathering resistance, distinctiveness, and so on. The lightness L* of the back face may be 90 or lower (e.g., 85 or lower). Although not particularly limited, from the same standpoint as the lightness L*, the back face preferably has a chromaticity a* defined by the L*a*b* color space in a range of ±15 (e.g., ±10, typically −8 to 2). Although not particularly limited, the back face preferably has a chromaticity b* in a range of ±15 (e.g., ±10, typically ±5). It is noted that in the present description, the term "a range of ±X" is used to indicate a range of −X to +X.

Although not particularly limited, the front face of the resin film may have a lightness L* of 50 or lower (e.g., 40 or lower, typically 30 or lower). The lightness L* of the front face is preferably 25 or lower. With the lightness L* of the front face being in such a low range, the resin film is likely to have a constitution with which a PSA layer to be placed adjacently or an entire PSA film comprising the resin film can be cut adequately with the prescribed laser beam. It is also advantageous such that when a colored absorbing agent is selected as the laser beam-absorbing agent described later, the influence of the color (hue, etc.) of the absorbing agent is not noticeable. Although not particularly limited, the front face may have a chromaticity a* defined by the L*a*b* color space in a range of ±15 (e.g., ±10, typically ±5). While not particularly limited, the front face may have a chromaticity b* in a range of ±15 (e.g., ±10, typically ±5).

When the resin film has a multi-layer constitution consisting of two or more layers, the respective layers are preferably constituted to have different lightness. For instance, in the resin film 10 having a tri-layer constitution as shown in FIG. 1, it is preferable that at least the first layer 11 and the second layer 12 have different lightness. This attains adequate laser beam cuttability with the prescribed laser beam in the first layer while the second layer may be provided with properties attainable by the difference in the lightness. Such properties may be designability, surface printability, weathering resistance, distinctiveness, and so on. The surface printability referred to herein encompasses greater flexibility in printing on the outer surface achievable by increasing the whiteness by means of setting the lightness higher for the back face of the resin film placed on the outer surface side of the PSA film, thereby making the hue, etc., of the outer surface less influential to prints on the outer surface. The weathering resistance encompasses an ability to prevent or reduce degradation by sunlight including ultraviolet rays. With the resin film comprising a layer that has a higher lightness and a layer having a lower lightness, it is provided with a capability to prevent penetration of sunlight, achieving great weathering resistance. The distinctiveness includes the outer surface color of the PSA film adhered on an adherend with the color being selected so as to be different from the surface color of the adherend, enabling one to easily recognize the presence or absence of the PSA film adhered on the adherend. A highly distinctive PSA film provides great workability. The first layer and the second layer differ in the lightness L* by preferably 5 or larger, more preferably 10 or larger, or particularly preferably 20 or larger (e.g., 30 or larger, typically 40 or larger). The difference may be 65 or smaller (e.g., 55 or smaller, typically 45 or smaller). The lightness L* values of the front face and the back face of the resin film as well as each layer forming an outer surface of the resin film can be measured without separating them into individual layers (can be measured in the form of the multi-layer resin film). When the resin film has a multi-layer constitution consisting of three or more layers, the lightness L* of a layer placed intermediately (e.g., an intermediate layer) can be measured in an exposed state obtainable by removing outer surface layers (e.g., the first layer and the second layer) by shaving or abrasion. Measurements can be taken with a colorimeter (trade name "CR-400" available from Konica Minolta Holdings Inc.; chromameter).

With the resin film having a multi-layer constitution consisting of at least two layers where the layer placed on the front face side (PSA layer side) of the resin film is referred to as the first layer, the first layer may have a lightness L* of 50 or lower (e.g., 40 or lower, typically 30 or lower) although not particularly limited to such ranges. The lightness L* of the first layer is preferably 25 or lower. When a black-color-based laser-beam-absorbing agent (e.g., a carbon black) is used as the laser beam-absorbing agent, the first layer may have a lightness L* in these ranges. It is preferable to position such a first layer to form the front face of the resin film. By this way, a PSA layer placed adjacently to the first layer and an entire PSA film possibly comprising a layer (typically, the second layer) that may be provided on the first layer can be preferably cut with the prescribed laser beam. The first layer is preferably a black layer or a gray layer (more preferably a black layer) as described later. Although not particularly limited, the chromaticity a* defined by the L*a*b* color space of the first layer may be in a range of ±15 (e.g., ±10, typically ±5). The chromaticity b* of the first layer is not particularly limited, either, and it may be in a range of ±15 (e.g., ±10, typically ±5).

When the resin film has a constitution consisting of at least two layers, with the layer placed on the back face side of the resin film being referred to as the second layer, the second layer has a lightness L* of suitably 40 or higher (e.g., 45 or higher, typically 55 or higher) or preferably 60 or higher (e.g., 65 or higher, typically 70 or higher) although not particularly limited to such ranges. It is preferable to position such a second layer to form the back face of the resin film. In this case, when the PSA film is adhered to an adherend, the back face forms the outer surface of the PSA film. Thus, by increasing the lightness of the second layer, the whiteness of the outer surface of the PSA film increases, providing properties such as designability, surface printability, weathering resistance, distinctiveness and so on. The second layer may have a lightness L* of 90 or lower (e.g., 85 or lower). The second layer is preferably a white layer or a gray layer (more preferably a white layer) as described later. From the same standpoint as the lightness L*, the chromaticity a* defined by the L*a*b* color space of the second layer is preferably in a range of ±15 (e.g., −10 to 5, typically −8 to 2) while not particularly limited to these ranges. Although not particularly limited, the chromaticity b* of the second layer is preferably in a range of ±15 (e.g., ±10, typically ±5).

When the resin film has a multi-layer constitution consisting of three or more layers, typically a tri-layer constitution as shown in FIG. 1, each of the first layer 11, the intermediate layer 13 and the second layer 12 shown in FIG. 1 can be a white layer, a gray layer, or a black layer while not particularly limited. Here, the term "white layer" refers to a layer having a lightness L* of 65 or higher (e.g., 65 or higher, but 90 or lower, typically 70 or higher, but 85 or lower). The term "gray layer" refers to a layer having a lightness L* higher than 25, but lower than 65. The term "black layer" refers to a layer having a lightness L* of 25 or lower (e.g., 0 or higher, but 25 or lower, 10 or higher, but lower than 25). The chromaticity values of white, gray and black layers are not particularly limited while each may have a chromaticity a* in a range of ±15 (e.g., −10 to 5, typically −8 to 2) and a chromaticity b* in a range of ±15 (e.g., ±10, typically ±5).

Typical examples of the second/intermediate/first layers include white/black/black layers, white/gray/black layers, white/white/black layers, gray/gray/gray layers, white/gray/gray layers, and gray/gray/black layers. Among these, the combinations of white/black/black layers and white/gray/black layers are preferable. The combination of white/gray/black layers is particularly preferable. With a white layer and a black layer being included, the weathering resistance of the PSA film may be increased. Thus, even when the PSA layer is constituted with a PSA having poor weathering resistance, such as natural rubber, etc., degradation of the PSA can be suitably prevented. By making the intermediate layer a white or gray layer, even if the first layer is a black layer, the lightness of the back face can be increased. When the intermediate layer is a gray or black layer, the laser beam cuttability that can be obtained tends to be greater. It is preferable that the second layer to form the outer surface of a PSA film is a white layer. This increases the lightness of the outer surface of the PSA film, providing properties such as designability, surface printability, weathering resistance, distinctiveness and so on. The first layer to form the front face of the resin film is preferably a black layer. By this way, the resin film is likely to have a constitution with which a PSA layer to be placed adjacently or an entire PSA film comprising the resin film can be cut preferably with the prescribed laser beam. In addition, when a colored absorbing agent is employed as the laser beam-absorbing agent described later, it is advantageous such that the influence by the color (hue, etc.) is not prominent.

It is preferable that a layer (e.g., at least one layer among the first, second and intermediate layers) constituting the resin film is opaque, or it is more preferable that all the layers constituting the resin film are opaque. Here, the term "opaque" may be understood to exclude being colorless and transparent. Alternatively, it can be understood as a concept that excludes being colored and transparent as well. As such, the laser absorbance tends to be set in a preferable range. It is noted that when the layers constituting the resin film are transparent, the cuttability of the resulting PSA film may decrease, whereby a high-quality cut may not be obtained. Because of this, the resin film preferably has a total light transmittance of 50% or lower (e.g., 20% or lower, typically 10% or lower). The resin film preferably has a haze of 80% or higher (e.g., 90% or higher, typically 95% or higher). Methods for measuring the total light transmittance and the haze of a resin film are based on JIS K7361. As the system to measure the total light transmittance and haze, can be used "HM-150" available from Murakami Color Research Laboratory Co., Ltd.

In the art disclosed herein, the resin film as a substrate has a laser beam transmittance of 20% or higher in a wavelength range of 1000 nm to 1100 nm. This laser beam transmittance indicates the actual proportion of the prescribed laser beam absorbed by the resin film relative to the intensity of the prescribed laser beam projected onto the resin film. A laser beam absorbance lower than 20% for the resin film will result in a low heating efficiency by projection of the prescribed laser beam, whereby the resin film and a PSA film comprising the resin film are not allowed to suitably decompose and disappear or melt down. Thus, the PSA film cannot be cut, or even if it could be cut to a certain extent, it will be hard to provide a high-quality cut consistently.

In the present description, the term "laser beam absorbance" refers to a value determined by substituting transmittance T (%) and reflectance R (%) values measured with a spectrophotometer (e.g., spectrophotometer under model number "U-4100" available from Hitachi High-Technologies Corporation or a similar system) into the following equation (I):

$$\text{Absorbance } A(\%) = 100(\%) - T(\%) - R(\%) \quad (I)$$

The term "laser beam absorbance in a wavelength range of 1000 nm to 1100 nm" refers to the minimum laser beam absorbance (or "Amin(1000,1100)" hereinafter) in the said wavelength range.

Cutting of the PSA film by the laser beam will be described with reference to the schematic diagrams shown in FIGS. 3 and 4. As shown in FIG. 4, with respect to PSA film 100 formed with resin film 110 having an Amin(1000,1100) lower than 20%, even if an adhesive face 20A of the PSA film 100 is adhered to an adherend and a prescribed laser beam LB is projected onto its back face, the area of PSA film 100 under the projection range of the laser beam LB cannot be sufficiently heated to decompose and disappear. Because of this, PSA film 100 cannot be cut with the prescribed laser beam LB, or even if it could be cut to a certain extent, the cut is made primarily by the PSA film 100 melting down and deforming due to the heat transferred from the adherend. Thus, for example, as shown in FIG. 4, the precision cannot be increased for the shapes of a cut edge surface 100E and a projection boarder 100 F (around the border between a region projected with the laser beam and a region not projected with the laser beam) or for the cut width, etc.

To the contrary, as shown in FIG. 3, when PSA film 1 comprising resin film 10 having an Amin(1000,1100) of 20% or higher is adhered to an adherend and the prescribed laser beam LB is projected onto its back face, the resin film 10 efficiently absorbs the prescribed laser beam LB to be heated, PSA film 1 is allowed to effectively decompose and disappear to result in a cut. Thus, the PSA film 1 can be cut with a cut width (the width of a gap formed by the laser beam projection) W being accurately controlled in accordance with the irradiation breadth of the prescribed laser beam. In typical, as shown in FIG. 3, PSA film 1 can be cut with a cut width W equal to or larger than the projection breadth (diameter) of the prescribed laser beam. A high-quality cut can be obtained with a cut edge surface 1E and projection border 1F both precisely shaped.

In the art disclosed herein, the resin film has a laser beam absorbance Amin(1000,1100) of preferably 30% or higher, or more preferably 55% or higher (e.g., 60% or higher, typically 70% or higher). The entire PSA film has a laser beam absorbance Amin(1000,1100) of preferably 20% or higher, more preferably 30% or higher, or yet more preferably 55% or higher (e.g., 60% or higher, typically 70% or higher). When the Amin(1000,1100) is far too low, cutting of the resin film (or even a PSA film comprising the resin film) with projection of the prescribed laser beam will be difficult, or a high-quality cut is less likely to be obtained. While the resin film may have 100% Amin(1000,1100), it is usually preferable to be 95% or lower. From the standpoint of reducing laser-cut residue (in typical, a reside primarily due to a laser beam-absorbing agent) of the PSA film, the resin film may have an Amin(1000,1100) of 90% or lower, or more preferably 85% or lower (e.g., 80% or lower).

Although not particularly limited, in the art disclosed herein, the resin film preferably has a laser beam reflectance of 5% or higher, but 40% or lower in a wavelength range of 1000 nm to 1100 nm. With the laser beam reflectance being in these ranges, the laser beam absorbance tends to be set in the preferable range. The laser beam reflectance may be higher than 5%, but 35% or lower (e.g., 10 to 30%). It is preferable that the entire PSA film also has a laser beam reflectance in the ranges given above.

Although not particularly limited, in the art disclosed herein, the resin film preferably has a laser beam transmittance of 5% or lower in a wavelength range of 1000 nm to 1100 nm. With the laser beam transmittance being in this range, the laser beam absorbance tends to be set in the preferable range. When the laser beam transmittance is far too high, the cuttability of the PSA film may decrease, whereby a high-quality cut may not be obtained. The laser beam transmittance is more preferably 3% or lower (typically 0%).

In the art disclosed herein, the resin film can comprise, as a laser beam-absorbing agent, a single species or a suitable combination of some species among various materials capable of increasing the Amin(1000,1100). Thus, in the present description, the term "laser beam-absorbing agent" refers to a material capable of producing an effect to turn the laser beam absorbance Amin(1000,1100) higher than in the corresponding resin film free of the laser beam-absorbing agent.

In the art disclosed herein, as the laser beam-absorbing agent, it is preferable to use one, two or more species selected from black-color-based laser beam-absorbing agents (or black-based absorbing agents, hereinafter) and white-color-based laser beam-absorbing agents (or white-based absorbing agents, hereinafter). Alternatively, among laser beam-absorbing agents other than black-based absorbing agents and white-based absorbing agents (or "non-black/white laser beam-absorbing agents", hereinafter), can be used one species solely or two or more species in combination, or any of these in combination with a black-based absorbing agent or a white-based absorbing agent. From the standpoint of the laser beam absorbing ability, it is desirable to use a black-based absorbing agent. In view of the designability, surface printability and distinctiveness, it is desirable to use a white-based absorbing agent.

Preferable examples of the black-based absorbing agent include carbon blacks. For example, it is preferable to use a carbon black having an average particle diameter of 10 nm to 500 nm (more preferably 10 nm to 120 nm). In the present description, unless otherwise specified, the term "average particle diameter" refers to a particle diameter at 50% cumulative volume in a size distribution measured using a particle counter based on the laser scattering/diffraction method (i.e., 50% volume average particle diameter, which may be abbreviated to "$D_{50}$" hereinafter). When a black-based absorbing agent as typified by carbon blacks is added to the resin film (or to a layer constituting the resin film) at 5% by mass or more (or 10% by mass or more), it can be understood as a black pigment.

Examples of a white-based absorbing agent include calcium carbonate, silica, alumina, titanium oxide, talc, clay, aluminum silicate, basic lead carbonate, zinc oxide, strontium titanate, barium sulfate, calcium sulfate and so on. Among these, can be used one species solely or a combination of two or more species. In particular, calcium carbonate and silica are preferable. The white-based absorbing agent referred to herein is a component that can be understood as a white pigment used to whiten the resin film. In view of such a different purpose of use, the white-based absorbing agent in the present description may be defined to exclude titanium oxide, which is a typical white pigment. It can be defined to further exclude one, two or more species (typically three species, typically all species) among alumina, talc, clay, aluminum silicate, basic lead carbonate, zinc oxide, strontium titanate, barium sulfate, and calcium sulfate. When a white-based absorbing agent is added to the resin film (or a layer constituting the resin film) at 5% by mass or more (or 10% by mass or more), it may be understood as a white pigment. Although not particularly limited, the white-based absorbing agent may have an average particle diameter ($D_{50}$) of 0.01 μm to 5 μm (e.g., 0.02 μm to 3 μm, typically 0.05 μm to 2 μm).

Preferable examples of non-black/white laser beam-absorbing agents include metals and metal compounds. Examples of the metal include aluminum, titanium, nickel, zirconium, tungsten, iron, copper, silver, gold, zinc, molybdenum, chromium, alloys primarily comprising these metals, and so on. Examples of metal compounds include oxides, nitrides, carbides, etc., of the metals (while excluding white-based absorbing agents such as aluminum oxide, titanium oxide, etc.). These metals and metal compounds can be preferably used as laser beam-absorbing agents, typically in a powder form. Other examples of non-black/white laser beam-absorbing agents include organic compounds that absorb the prescribed laser beam. Examples of such organic compounds include quaterrylene-based compounds, perylene-based compounds, phthalocyanine-based compounds, cyanine-based compounds, aminium-based compounds, naphtalocyanine-based compounds, naphthoquinone-based compounds, diimonium-based compounds, anthraquinone-based compounds, aromatic dithiol-based metal complexes (e.g., nickel complexes) and so on. Among these, organic quaterrylene bisimides are preferable. Specific examples include "Lumogen IR 765", "Lumogen IR 788" and "Lumogen IR 1050" (all are trade names of BASF Corporation). These are preferable for having high transparency and thus being less likely to alter the hue and color tone of the resin film. It is preferable that the non-black/white laser beam-absorbing agent has an average particle diameter ($D_{50}$) of 0.01 μm or larger, but 20 μm or smaller (e.g., 0.1 μm or larger, but 10 μm or smaller, typically 1 μm or larger, but 5 μm or smaller).

The laser beam-absorbing agent content in the resin film can be, for instance, 0.01% by mass or greater, or preferably 0.05% by mass or greater (e.g., 0.07% by mass or greater). Too high a laser beam-absorbing agent content may be likely to result in a prominent laser-cut residue. Thus, usually, the laser beam-absorbing agent content in the resin film is suitably lower than 10% by mass or preferably lower than 5% by mass (e.g., 3% by mass or lower, typically 2% by mass or lower). When the laser beam-absorbing agent is a black-based absorbing agent, the upper limit of its content is preferably 3% by mass or lower (typically lower than 3% by mass), or more preferably 2% by mass or lower (typically lower than 2% by mass). When the laser beam-absorbing agent is a white-based absorbing agent, the upper limit of its content may be 20% by mass or lower (e.g., 15% by mass or lower, typically 12% by mass or lower), or may be lower than 10% by mass (typically lower than 5% by mass).

When the resin film has a constitution consisting of at least two layers, it is preferable that each layer contains the laser beam-absorbing agent described above. In a preferable embodiment, each of the first layer and the second layer comprises a laser beam-absorbing agent. The first layer and the second layer may comprise different laser beam-absorbing agents. In particular, when the first layer is placed on the front face side of the resin film, the first layer preferably contains a black-based absorbing agent (typically a carbon black). When the second layer is placed on the back face side of the resin film, the second layer preferably contain a white-based absorbing agent (particularly preferably calcium carbonate or silica) as a laser beam-absorbing agent. It is preferable to add "Lumogen IR 765", "LumogenIR 788" or "LumogenIR 1050" listed earlier as a laser beam-absorbing agent in addition to or instead of a white-based absorbing agent. When an intermediate layer is provided between the first layer and the second layer, the intermediate layer preferably contains a black-based absorbing agent and/or a white-based absorbing agent as the laser beam-absorbing agent. In these cases, the intermediate layer may be one of a black layer, a white layer and a gray layer. Each layer may further contain a non-black/white laser beam-absorbing agent. In a preferable embodiment, the first layer and the second layer comprise different laser beam-absorbing agents. When an intermediate layer is further provided, laser beam-absorbing agents added to the first, second and intermediate layers may be all different. The laser beam-absorbing agent content in each layer can be at the same level as the laser beam-absorbing agent content in the resin film described earlier. It is noted that not all layers constituting the multi-layer resin film necessarily contain a laser beam-absorbing agent. It is preferable that among the respective layers in the resin film, at least one layer (typically the first layer) placed on the PSA layer side contains a laser beam-absorbing agent.

Examples of a material that can be used as a resin component constituting the resin film include polyolefin resins such as polyethylene, polypropylene, ethylene-propylene copolymers, polypropylene-polyethylene blend resins, etc.; polyester resins such as polyethylene terephthalate, polybutylene terephthalate, etc., as well as vinyl chloride resins, vinyl acetate resins, polyamide resins and so on. A resin film can be formed by typically molding a material into a film, with the material being a resin composition prepared by adding a laser beam-absorbing agent to such a resin material. The molding method is not particularly limited, and can be suitably employed a heretofore known extrusion method (e.g., an inflation extrusion method, a T-die extrusion method), casting method, and like methods. When the resin film comprises at least two layers (typically two or more resin layers), a resin film comprising multiple resin layers can be obtained by employing a single method or a suitable combination of methods among a method where resin compositions corresponding to the respective resin layers are molded simultaneously (e.g., by a multi-layer inflation method or a multi-layer T-die method), a method where the respective layers are individually molded and then adhered to each other, a method where a layer is casted on top of another pre-formed layer, and other like methods. The resin components constituting the respective resin layers can be suitably selected from the species listed earlier. The resin components in the respective resin layers may be the same or different from one another.

The resin film (or a layer constituting the resin film) preferably contain a colorant such as pigments, dyes, or the like. Preferable examples of the colorant include white-based colorants and black-based colorants. When the second layer is placed on the back face side of the resin film, the second layer preferably comprises a known white-based colorant (particularly preferably a white pigment). When the first layer is placed on the front face side of the resin film, the first layer preferably comprises a known black-based colorant (particularly preferably a black pigment). Examples of a white-based colorant include inorganic colorants such as titanium oxide, etc.; organic colorants such as acrylic resin particles, etc.; and the like. Examples of a black-based colorant include inorganic colorants such as carbon blacks, etc.; organic colorants such as anthraquinone-based black dyes, etc.; and the like. Among these colorants, can be used a single species solely or a combination of two or more species.

The colorant content is not particularly limited and can be in a known range. For instance, it can be 0.1 to 30% by mass, or preferably 0.1 to 25% by mass (typically 0.1 to 20% by mass) of the resin film. When the layers (e.g., the second layer and/or the intermediate layer, particularly preferably the second layer) constituting the resin film comprise a white-based colorant (typically a white pigment), its content is suitably 5% by mass or greater, or it can be 6% by mass or greater (e.g., 7% by mass or greater). The upper limit of the white-based colorant (typically a white pigment) content is suitably 20% by mass or lower, or it can be 15% by mass or lower (e.g., 10% by mass or lower). When the layers (e.g., the first layer and/or the intermediate layer, particularly preferably the first layer) constituting the resin film comprise a black-based colorant (typically a black pigment), its content is suitably 5% by mass or greater, or it can be 6% by mass or greater (e.g., 7% by mass or greater). The upper limit of the black-based colorant (typically a black pigment) content is suitably 20% by mass or lower, or it can be 15% by mass or lower (e.g., 10% by mass or lower).

The resin film may comprise optional additives as necessary. Examples of such additives include fire-retardants, anti-static agents, photostabilizing agents (radical scavengers, ultraviolet ray-absorbing agents, etc.), antioxidants, and the like.

The resin film may be printed on the back face. In such a case, by increasing the whiteness of the back face of the resin film, the flexibility in printing thereon increases and good prints can be produced. The printing method is not particularly limited, and can be suitably employed a method among various known or commonly used methods such as off-set printing, silk screen printing, typography, flexography, gravure printing and so on.

A surface of the resin film may be subjected as necessary to a treatment to increase the adhesion to an adjacently-placed material. Examples of a treatment to increase the adhesion include corona discharge treatment, acid treatment, ultraviolet ray irradiation, plasma treatment, primer coating, and so on. Such a surface treatment can be preferably applied to either the front face or the back face of the resin film. When the resin film is printed on a surface thereof, after subjected to a surface treatment (e.g., corona discharge treatment) described above, the resin film can be printed on the surface and subjected to a release treatment described below.

At least one surface (the front face and/or the back face, preferably the back face) of the resin film may be subjected to a suitable surface treatment to increase the release. In a resin film subjected to such a surface treatment, at least one surface may be made to be a release face. A resin film having the surface pre-subjected to a release treatment (typically a resin film provided with a release layer produced via a treatment with a release agent) can be preferably used. A known or commonly used release agent can be used to form the release layer. Examples of such a release agent include silicone-based release agents and non-silicone-based release agents. As a non-silicone-based release agent, can be used a fluorine-based or a long chain alkyl-based release agent. A release agent can be a condensation product such as a polyamide, etc., or an addition polymer-based release agent. For a resin film formed of a less adhesive material including a less polar polymer, etc., such as polyolefin resins or the like, a surface of the film can be used as a release face without any particular release treatment. Alternatively, a surface of the resin film formed of a less adhesive material may be subjected further to a release treatment. The release treatment method (typically a method for applying a release agent) is not particularly limited, and a heretofore known application means can be suitably employed. A release treatment (typically formation of a release layer) as described above may be given to a resin film in advance, or it can be carried out during a course of procedure to provide a PSA layer on the resin film and winding the resultant, for instance, before or after providing the PSA layer, but before the winding. With respect to a release liner-covered PSA film comprising a release liner, the release treatment can be applied to the release liner.

It is usually suitable that the resin film has a thickness of about 10 µm to 150 µm. When it is much thinner than 10 µm or much thicker than 150 µm, the handling properties of the resin film or of a PSA film comprising the resin film may be likely to decrease. In a preferable embodiment, the resin film has a thickness of 20 µm to 110 µm (more preferably 40 µm to 100 μm). When the resin film has at least two layers, each layer may independently have a thickness of 3 μm or larger (e.g., 5 μm or larger, typically 10 μm or larger). The thickness of each layer may be independently 70 μm or smaller (e.g., 50 μm or smaller, typically 40 μm or smaller).

When the resin film has a black layer (the first layer) placed on the front face side and a white layer (the second layer) placed on the back face side as described earlier, by making the black layer thicker, the laser beam absorbance can be increased and the cuttability of the resin film can be increased. By making the white layer thicker, properties such as the designabilty, surface printability, weathering resistance, distinctiveness, and so on can be increased. When an intermediated layer is further placed between the black layer and the white layer, if the intermediate layer is a white layer or a gray layer, by making the intermediate layer thicker, the lightness of the back face can be increased. When the second layer of the resin film is made thinner, that is when the thickness of the second layer is 25 μm or smaller (e.g., 20 μm or smaller, typically 15 μm or smaller), even if a laser beam-absorbing agent is not added to the second layer, the second layer will easily melt down by heat transferred from an adjacently-placed layer. This can yield a high-quality cut while it also has a cost advantage.

When the resin film has a multi-layer constitution consisting of two or more layers, it is suitable that each of the first layer and the second layer independently accounts for 10% or more (e.g., 30% or more, typically 50% or more) of the thickness of the entire resin film while each may account for 90% or less (e.g., 70% or less, typically 50% or less). When an intermediate layer is further placed, it is suitable that each of the first layer, the second layer and the intermediate layer independently accounts for 10% or more (e.g., 15% or more, typically 30% or more) of the thickness of the entire resin film, while each may account for 50% or less (e.g., 40% or less, typically 35% or less). It is noted that the thicknesses of the first layer and the second layer as well as the intermediate layer if any are suitably selected within ranges so that their total does not exceed 100%. When the resin film has a bi-layer or a try-layer constitution, the thicknesses of the respective layers constituting the resin film are selected so as to be totaled to 100%.

In the art disclosed herein, the PSA constituting the PSA layer is not particularly limited. For instance, can be used a known rubber-based PSA, acrylic PSA, polyester-based PSA, polyurethane-based PSA, silicone-based PSA, or the like. From the standpoint of the adhesive performance and the cost, can be preferably used a rubber-based PSA or an acrylic PSA. The PSA layer may have a mono-layer constitution, or a laminate constitution consisting of two or more layers of different compositions.

Examples of a rubber-based PSA include natural rubber-based PSA, synthetic rubber-based PSA and the like. Examples of a rubber-based polymer as the base polymer of a synthetic rubber-based PSA include polybutadiene, polyisoprene, butyl rubber, polyisobutylene, styrene-based elastomers such as styrene-butadiene-styrene block copolymers, styrene-ethylene/butylene-styrene block copolymers, styrene-ethylene/butylene random copolymers, etc., and others such as ethylene propylene rubber, propylene butane rubber, ethylene propylene butane rubber, and the like.

A preferable acrylic PSA comprises as a base polymer (a primary component among polymer components), for instance, an acrylic polymer having a monomer composition comprising primarily an alkyl (meth)acrylate such as butyl (meth)acrylate, 2-ethylhexyl (meth)acrylate, etc., and further comprising as necessary a modifying monomer copolymerizable with the alkyl (meth)acrylate. Examples of the modifying monomer include hydroxyl group-containing monomers such as 2-hydroxylethyl (meth)acrylate, etc.; carboxyl group-containing monomers such as (meth)acrylic acid, etc.; styrene-based monomers such as styrene, etc.; vinyl esters such as vinyl acetate, etc.; and the like. Such an acrylic PSA can be obtained by a commonly used polymerization method such as a solution polymerization method, an emulsion polymerization method, an ultraviolet ray (UV) polymerization method, or the like.

The PSA layer may contain a laser beam-absorbing agent. In a PSA layer consisting of multiple layers, at least one layer among them can contain a laser beam-absorbing agent. For the laser beam-absorbing agent to be contained in the PSA layer, can be suitably selected one, two or more species among the laser beam-absorbing agents listed earlier. The laser beam-absorbing agent content in the PSA layer is suitably 5% by mass or less, or preferably 3% by mass or less (e.g., 1% by mass or less). Too high a laser beam-absorbing agent content may result in degraded adhesive performance. The art disclosed herein can be practiced preferably in an embodiment where the PSA layer is essentially free of a laser beam-absorbing agent.

The PSA layer can contain optional additives as necessary. Examples of such additives include crosslinking agents, tackifiers, softening agents, fire retardants, anti-static agents, colorants (pigments, dyes, etc.), photostabilizing agents (radical scavengers, UV-absorbing agents, etc.), antioxidants, and so on.

The thickness of the PSA layer can be suitably selected so that adhesive performance suitable to the application of the PSA film can be obtained. Usually, the PSA layer has a thickness of suitably 0.5 μm to 50 μm or preferably 1 μm to 30 μm (e.g., 2 μm to 20 μm).

The method for providing a PSA layer on the resin film is not particularly limited. For example, can be suitably employed a known method such as a method where a solution or a dispersion containing PSA layer-forming components dissolved in an organic solvent or dispersed in an aqueous solvent is applied to the resin film and allowed to dry to directly form a PSA layer on the resin film surface, a method where a PSA layer pre-formed on a release surface is transferred to the resin film, a method where a PSA layer-forming composition and a resin film-forming composition are co-extruded (extruded in multiple layers), or the like method.

The PSA film disclosed herein is preferable as a PSA film (PSA film for laser cutting) that is used in an application involving cutting with a laser beam (a prescribed laser beam) having a center wavelength of 1000 nm to 1100 nm. The PSA film may be cut with the prescribed laser beam either before or after its adhesion to an adherend. Examples of an embodiment where the PSA film is cut with the prescribed laser beam before its adhesion to an adherend include an embodiment as shown in FIG. 2 in which while a surface of PSA layer 20 is being protected with release liner 30, a prescribed laser beam is projected onto the back face (back face 10B of resin film 10) of PSA film 1 to cut just the PSA film 1 while leaving release liner 30 as is, and an embodiment in which PSA film 1 is cut along with release liner 30. The PSA film cut into a desirable shape can be subsequently adhered to any adherend to serve a purpose such as surface protection, decoration, or labeling of the adherend, bonding to another adherend, etc. As an embodiment where the PSA film is cut with the prescribed laser beam after its adhesion to an adherend, can be cited an embodiment in which the PSA film is adhered to a surface of a work piece and the prescribed laser beam is projected onto the back face of the PSA film to carry out a laser machining (cutting, hole-making, shaving, etc.) of the work piece. In such an embodiment, the PSA film may be able to function as a protection film to protect a surface of the work piece before, after or during the laser machining.

EXAMPLES

Several worked examples relating to the present invention are described below, but the present invention is not intended to be limited to these examples. In the description below, "parts" and '%' are based on the mass unless otherwise specified.

In the worked examples indicated below, the following materials were used for fabrication of the resin films.

LDPE: low density polyethylene (trade name "PETROTHENE 186R" available from TOSOH Corporation)

PP: random polypropylene (trade name "PRIME POLYPRO F-744NP" available from Prime Polymer Co., Ltd.)

PBT: polyethylene terephthalate (trade name "NOVADURAN 5505S" available from Mitsubishi Engineering-Plastics Corporation)

CB: carbon black powder of 20 nm average diameter

Al: aluminum flake of 2 µm average diameter $CaCO_3$: calcium carbonate powder of 2 µm average diameter'

$SiO_2$: silica powder of 4 µm average diameter

L1050: laser beam-absorbing agent (trade name "LumogenIR 1050" available from BASF Corporation)

$TiO_2$: titanium dioxide powder of 0.2 µm average diameter

Example 1

A PSA film 1 having the same constitution as shown in FIG. 1 was fabricated as described below. In particular, materials shown in Table 1 were co-extruded at a die temperature of 165° C. using a 3-layer co-extrusion film inflation machine (inflation method) to fabricate a tri-layer resin film 10 having a total thickness of 90 µm. Table 1 shows the respective compositions and thickness of the first layer 11, the intermediate layer 13, and the second layer 12 constituting this resin film 10.

A first face (the surface on the first layer 11 side) of the fabricated resin film was subjected to a corona discharge treatment. The PSA composition P1 described below was applied to the corona discharge-treated surface and was allowed to dry to form a layer of 15 µm thickness after dried. A PSA film 1 having a natural rubber-based PSA layer 20 on a first face of a substrate was thus obtained. In this PSA film 1, the second layer 12, the intermediate layer 13 and the first layer 11 of the resin film 10 were a white layer, a black layer and a black layer, respectively, with a PSA layer 20 being provided on the side of the first layer 11.

(PSA Composition P1)

To 100 parts of a natural rubber, were added and mixed 70 parts of a tackifier (trade name "QUINTONE A100" available from Zeon Corporation), 2 parts of an anti-aging agent (trade name "NOCRAC NS-5" available from Ouchi Shinko Chemical Industrial Co., Ltd.), 3 parts of an isocyanate-based crosslinking agent (trade name "CORONATE L" available from Nippon Polyurethane Industry Co., Ltd.) and toluene to obtain a natural rubber-based PSA composition P1.

Example 2, Example 3

Resin films according to Examples 2 and 3 were fabricated in the same manner as Example 1 except that the compositions and thickness of the first, intermediate and second layers were modified as shown in Table 1. Using these fabricated resin films, respectively, PSA films according to Examples 2 and 3 were obtained in the same manner as Example 1. In these PSA films, the second, intermediate and first layers were a white layer, a black layer and a black layer, respectively.

Example 4

A resin film according to Example 4 was fabricated in the same manner as Example 1 except that the compositions and thickness of the first, intermediate and second layers were modified as shown in Table 1. Using this fabricated resin film, a PSA film according to Example 4 was obtained in the same manner as Example 1. In this PSA film, the second, intermediate and first layers were a white layer, a gray layer and a black layer, respectively.

Example 5

A resin film according to Example 5 was fabricated in the same manner as Example 1 except that the compositions and thickness of the first, intermediate and second layers were modified as shown in Table 1. Using this fabricated resin film, a PSA film according to Example 5 was obtained in the same manner as Example 1. In this PSA film, the second, intermediate and first layers were a gray layer, a gray layer and a gray layer, respectively.

Example 6 to 10

Resin films according to Examples 6 to 10 were fabricated in the same manner as Example 1 except that the compositions and thickness of the first, intermediate and second layers were modified as shown in Table 2. Using these fabricated resin films, respectively, PSA films according to Examples 6 to 10 were obtained in the same manner as Example 1. In these PSA films, the second, intermediate and first layers were a white layer, a gray layer and a black layer, respectively.

Example 11

A resin film according to Example 11 was fabricated in the same manner as Example 1 except that the compositions and thickness of the first, intermediate and second layers were modified as shown in Table 2. Using this fabricated resin film, a PSA film according to Example 11 was obtained in the same manner as Example 1. In this PSA film, the second, intermediate and first layers were a white layer, a white layer and a white layer, respectively.

Example 12

By the inflation method, LDPE was extruded at a die temperature of 165° C. to obtain a 60 µm thick mono-layer resin film. A first face of the resin film was subjected to a corona discharge treatment. The PSA composition P2 described below was applied to the corona discharge-treated surface and was allowed to dry to form a layer of 4 µm thickness after dried. A PSA film having an acrylic PSA layer on a first face of a substrate was thus obtained.

(PSA Composition P2)

A mixture containing 2-ethylhexyl acrylate, vinyl acetate and acrylic acid at a ratio of 100/80/5 was polymerized in the presence of benzoyl peroxide (polymerization initiator) in toluene to obtain an acrylic polymer having a weight average molecular weight of $60 \times 10^4$. To 100 parts of the acrylic polymer, was added and mixed 2 parts of an epoxy-based crosslinking agent (trade name "TETRAD C" available from Mitsubishi Gas Chemical Company Inc.) to obtain a PSA composition P2.

Example 13

3% $TiO_2$ and 97% LDPE were processed at a resin temperature of 180° C. with a twin screw extruder (available from Toshiba Machine Co., Ltd.) to obtain pellets for a substrate. The resulting pellets were extruded at a die temperature of 180° C. by the inflation method to obtain a 100 μm thick mono-layer resin film. The PSA composition P1 was applied to the corona discharge-treated surface and was allowed to dry to form a layer of 10 μm thickness after dried. A PSA film having a natural rubber-based PSA layer on a first face of a substrate was thus obtained.

Example 14

0.05% CB and 99.95 LDPE were processed at a resin temperature of 180° C. with the extruder to obtain pellets for a substrate. The resulting pellets were extruded at a temperature of 165° C. by the inflation method to obtain a 90 μm thick mono-layer resin film.

Example 15

PP was extruded at a die temperature of 230° C. by the T-die method to obtain a 40 μm thick mono-layer resin film.

Example 16

PBT was extruded at a die temperature of 245° C. by the T-die method to obtain a 40 μm thick mono-layer resin film.

Example 17

0.1% Al and 99.9% LDPE were processed at a resin temperature of 180° C. with the extruder to obtain pellets for a substrate. The resulting pellets were extruded at a die temperature of 165° C. by the inflation method to obtain a 90 μm thick resin film.

EVALUATIONS

Samples of appropriate dimensions were cut out from the PSA films and resin films fabricated according to the respective examples above and subjected to the following evaluations.
(1) Transmittance
Measurement system: spectrophotometer under model number "U-4100" available from Hitachi High-Technologies Corporation
Measurement conditions: measurement mode-applied detection, % T (transmittance) data mode, 750 nm/min scan rate, 1 nm sampling interval, automated slit control, photo-multiplier voltage automated at 1, intensity control mode fixed, high resolution measurement OFF, no dimming film used, PbS sensitivity at 1, 10 mm cell length.

Measurement Method:
(i). The measurement system was turned on and kept in standby for 2 hours or longer to stabilize the system. Subsequently, without any sample set in, the baseline was measured.
(ii). A sample was then set in the transmittance measuring region of the measurement system (for a case of a PSA film, in such a way that the light would enter the PSA film from the back face), and under the measurement conditions shown above, the transmittance in a wavelength range of 1000 nm to 1100 nm was measured.
(2) Reflectance
Measurement system: spectrophotometer under model number "U-4100" available from Hitachi High-Technologies Corporation
Measurement conditions: measurement mode-applied detection, % R (reflectance) data mode, 750 nm/min scan rate, 1 nm sampling interval, automated slit control, photo-multiplier voltage automated at 1, intensity control mode fixed, high resolution measurement OFF, no dimming film used, PbS sensitivity at 1, 10 mm cell length.

Measurement Method:
(i). The measurement system was turned on and kept in standby for two hours or longer to stabilize the system. Subsequently, a standard white plate was set in the reflectance measuring region (with no sample set) and the baseline was measured.
(ii). A sample was then set in the reflectance measuring region. Here, in order to prevent reflection of the light that had transmitted through the sample, a resin plate under trade name "CLAREX (registered trademark)" (black-colored, 1 mm thick) available from Nitto Jushi Kogyo Co., LTD. was placed opposite to the surface on which the light entered. When the sample was a PSA film, the PSA film was adhered to the resin plate (adhering condition: 2 kg roller moved back and forth once). Under the measurement conditions shown above, the reflectance in the wavelength range of 1000 nm to 1100 nm was measured.
(3) Absorbance
Substituting the transmittance T (%) and reflectance R (%) values into the next equation: 100(%)−T (%)−R (%), the minimum absorbance in the 1000 nm to 1100 nm wavelength range, Amin (1000, 1100), was determined. The results are shown in Tables 1 to 3 along with the values of transmittance T(Amin) and reflectance R(Amin) at the wavelength of the minimum absorbance.
(4) Laser Cutting
(4-1) Laser Cutting (i)
Each sample (a PSA film adhered on a 1 mm thick SUS304 2B plate or a resin film with the edges being fastened with PSA tape) was set on the work support of a laser welder (model number "YLM-500P" available from Amada Co., Ltd.) and a laser beam was projected onto a prescribed cut line under the following conditions:
Laser used: YAG laser (1064 nm wavelength, 500 W output)
Beam condition: 10 m/min moving speed
(4-2) Laser Cutting (ii)
Each sample (a PSA film adhered on a 1 mm thick SUS304 2B plate or a resin film with the edges being fastened with PSA tape) was set on the work support of a laser welder (model number "M802E" available from Omron Laserfront Inc.) and a laser beam was projected onto a prescribed cut line thereof under the following conditions:
Laser used: YAG laser (1.06 μm wavelength, 200 W output)
Beam condition: 5 m/min moving speed With respect to the laser cutting (i) and the laser cutting (ii), the state of each sample after the laser beaming was observed under an optic microscope (magnified 100×) and graded the cuttability with the laser beam (laser beam cuttability) into the following two levels.

Good: The sample (PSA film only or resin film only) was able to be cut with a cut width equal to or larger than the laser beam diameter (good laser beam cuttability).

Poor: The sample (PSA film only or resin film only) could not be cut or the cut width was smaller than the laser beam diameter (poor laser beam cuttability).

The evaluation results of the laser cutting (i) and laser cutting (ii) are shown in Tables 1 to 3.

(5) Lightness and Chromaticity

With respect to the front faces (surfaces on the first layer-side) and the back faces (surfaces on the second layer-side) of resin films according to Examples 1 to 10, the lightness and the chromaticity were measured. In particular, each resin film of 10 cm by 10 cm was placed on a SUS430 plate, and using a chromameter ("CR-400" available from Konica Minolta Holdings Inc.), the lightness $L^*$ as well as chromaticities $a^*$ and $b^*$ as defined by the $L^*a^*b^*$ color space were measured at 5 spots in total, namely four corner spots and a center spot, on the resin film. The measurement was taken twice at each measurement spot and the average value of the 10 total measured values was used. The results are shown in Tables 1 to 2.

TABLE 1

| | | Ex. 1 | Ex. 2 | Ex. 3 | Ex. 4 | Ex. 5 |
|---|---|---|---|---|---|---|
| PSA layer | Type | | | natural rubber-based | | |
| | Thickness (μm) | | | 15 | | |
| First layer | Composition (%) | | | | | |
| | LDPE | 99 | 99 | 99 | 99 | 97.0 |
| | CB | 1 | 1 | 1 | 1 | 1.0 |
| | $TiO_2$ | — | — | — | — | 2.0 |
| | Thickness (μm) | 30 | 35 | 35 | 35 | 30 |
| Intermediate layer | Composition (%) | | | | | |
| | LDPE | 99 | 99 | 99 | 95 | 97.9 |
| | CB | 1 | 1 | 1 | 1 | 0.1 |
| | $TiO_2$ | — | — | — | 4 | 2.0 |
| | Thickness (μm) | 30 | 35 | 35 | 35 | 30 |
| Second layer | Composition (%) | | | | | |
| | LDPE | 89 | 89 | 92 | 90 | 97.9 |
| | CB | — | — | — | — | 0.1 |
| | $CaCO_3$ | — | — | 1 | — | — |
| | L1050 | 3 | 3 | — | 3 | — |
| | $TiO_2$ | 8 | 8 | 7 | 7 | 2.0 |
| | Thickness (μm) | 30 | 20 | 20 | 20 | 30 |
| Transmittance (%) | | 0 | 0 | 0 | 0 | 4 |
| Reflectance (%) | | 25 | 20 | 23 | 23 | 13 |
| Absorbance (%) | | 75 | 80 | 77 | 77 | 83 |
| Laser cutting | (i) | Good | Good | Good | Good | Good |
| | (ii) | Good | Good | Good | Good | Good |
| First layer-side surface | Lightness $L^*$ Chromaticity | 23.49 | 23.29 | 23.04 | 23.31 | 26.87 |
| | $a^*$ | −1.71 | −1.72 | −1.73 | −1.72 | −1.91 |
| | $b^*$ | 2.47 | 2.44 | 2.43 | 2.42 | 0.83 |
| Second layer-side surface | Lightness $L^*$ Chromaticity | 71.93 | 67.14 | 71.83 | 68.24 | 45.19 |
| | $a^*$ | −6.08 | −5.97 | −6.04 | −5.88 | −3.53 |
| | $b^*$ | −3.22 | −4.44 | −3.47 | −4.16 | −0.08 |

TABLE 2

| | | Ex. 6 | Ex. 7 | Ex. 8 | Ex. 9 | Ex. 10 | Ex. 11 |
|---|---|---|---|---|---|---|---|
| PSA layer | Type | | | natural rubber-based | | | |
| | Thickness (μm) | | | 15 | | | |
| First layer | Composition (%) | | | | | | |
| | LDPE | 99 | 99 | 99 | 99 | 99 | 92 |
| | CB | 1 | 1 | 1 | 1 | 1 | — |
| | $TiO_2$ | — | — | — | — | — | 8 |
| | Thickness (μm) | 34 | 34 | 34 | 34 | 34 | 30 |
| Intermediate layer | Composition (%) | | | | | | |
| | LDPE | 95 | 95 | 95 | 95 | 95 | 92 |
| | CB | 1 | 1 | 1 | 1 | 1 | — |
| | $TiO_2$ | 4 | 4 | 4 | 4 | 4 | 8 |
| | Thickness (μm) | 34 | 34 | 34 | 34 | 34 | 30 |
| Second layer | Composition (%) | | | | | | |
| | LDPE | 93 | 89 | 81 | 89 | 81 | 92 |
| | CB | — | — | — | — | — | — |
| | $CaCO_3$ | — | 4 | 12 | — | — | — |
| | $SiO_2$ | — | — | — | 4 | 12 | — |
| | $TiO_2$ | 7 | 7 | 7 | 7 | 7 | 8 |
| | Thickness (μm) | 19 | 19 | 19 | 19 | 19 | 30 |

TABLE 2-continued

|  |  | Ex. 6 | Ex. 7 | Ex. 8 | Ex. 9 | Ex. 10 | Ex. 11 |
|---|---|---|---|---|---|---|---|
| Transmittance (%) | | 0 | 0 | 0 | 0 | 0 | 38 |
| Reflectance (%) | | 23 | 24 | 26 | 22 | 21 | 60 |
| Absorbance (%) | | 77 | 76 | 74 | 78 | 79 | 2 |
| Laser cutting | (i) | Good | Good | Good | Good | Good | Poor |
| | (ii) | Good | Good | Good | Good | Good | Poor |
| First layer-side surface | Lightness L* Chromaticity | 23.10 | 23.03 | 23.01 | 22.62 | 22.48 | — |
| | a* | −1.72 | −1.68 | −1.69 | −1.70 | −1.69 | — |
| | b* | −2.38 | 2.44 | 2.44 | 2.37 | 2.42 | — |
| Second layer-side surface | Lightness L* Chromaticity | 68.77 | 68.79 | 72.15 | 70.70 | 69.74 | — |
| | a* | −5.86 | −5.88 | −6.01 | −6.03 | −6.03 | — |
| | b* | −3.69 | −3.76 | −3.24 | −4.15 | −4.54 | — |

TABLE 3

| | | Ex. 12 | Ex. 13 | Ex. 14 | Ex. 15 | Ex. 16 | Ex. 17 |
|---|---|---|---|---|---|---|---|
| PSA layer | Type | acrylic | natural rubber-based | — | — | — | — |
| | Thickness (μm) | 4 | 10 | — | — | — | — |
| Resin film | Composition (%) | | | | | | |
| | LDPE | 100 | 97 | 99.95 | — | — | 99.9 |
| | PP | — | — | — | 100 | — | — |
| | PBT | — | — | — | — | 100 | — |
| | CB | — | — | 0.05 | — | — | — |
| | Al | — | — | — | — | — | 0.1 |
| | TiO$_2$ | — | 3 | — | — | — | — |
| | Thickness (μm) | 60 | 100 | 90 | 40 | 40 | 90 |
| Transmittance (%) | | 92 | 55 | 75 | 93 | 89 | 52 |
| Reflectance (%) | | 8 | 37 | 9 | 6 | 9 | 32 |
| Absorbance (%) | | 0 | 8 | 16 | 1 | 2 | 16 |
| Laser cutting | (i) | Poor | Poor | Poor | Poor | Poor | Poor |
| | (ii) | Poor | Poor | Poor | Poor | Poor | Poor |

As shown in Tables 1 to 3, the PSA films of Examples 1 to 10 having a laser beam absorbance Amin (1000, 1100) of 20% or higher, all exhibited good laser beam cuttability. These PSA films had a laser beam reflectance of 5% or higher, but 40% or lower in the 1000 nm to 1100 nm wavelength range and a laser beam transmittance of 5% or lower in the said wavelength range. Especially, PSA films of Examples 1 to 4 and 6 to 10, with each having an Amin (1000, 1100) of 80% or lower resulted in a less laser-cut residue left and yielded cut edges of greater visual quality in comparison to Example 5 having an Amin(1000, 1100) above 80%. On the other hand, PSA films or resin film of Examples 11 to 17, with each not meeting a laser absorbance Amin(1000, 1100) of 20% or higher while having a laser transmittance exceeding 5%, all resulted in poor laser cuttability.

Resin films according to Examples 1 to 4 and 6 to 10 all had a lightness L* of 65 or higher on the second layer-side surface (the back face of the resin film), which was to form the outer surface of the PSA film. Thus, with the increased whiteness of the outer surface of the PSA film, increases in the designability, surface printability, weathering resistance, distinctiveness, and so on are expected. In addition, the first layer-side surface, which was the front face of the resin film according to each example had a lightness L* of 25 or lower, being likely to allow an adjacent PSA layer or a PSA film comprising the resin film to be cut easily with the prescribed laser beam.

Although specific embodiments of the present invention have been described in detail above, these are merely examples and do not limit the scope of the claims. The art according to the claims includes various modifications and changes made to the specific embodiments illustrated above.

REFERENCE SIGNS LIST

1: PSA film
10: resin film
11: a first layer
12: a second layer
13: an intermediate layer
20: PSA layer
30: release liner
LB: laser beam
W: cut width

What is claimed is:

1. A pressure-sensitive adhesive film comprising a resin film as a substrate and a pressure-sensitive adhesive layer provided at least on a face of the resin film, wherein:
the resin film has a bi-layer constitution consisting of a first layer and a second layer,
wherein the first layer is placed on the pressure-sensitive adhesive side,
the first layer contains a black-based laser beam-absorbing agent,
the second layer contains a white-based laser beam-absorbing agent, and
the resin film has a laser beam reflectance of 5% or higher, but 40% or lower in a wavelength range of 1000 nm to 1100 nm, has a laser beam transmittance of 5% or lower in the said wavelength range, and is capable of being cut by a laser beam having a center wavelength of 1000 nm to 1100 nm.

2. The pressure-sensitive adhesive film according to claim 1, wherein the resin film has a front face and a back face having different lightness L* values, with the lightness L* being defined by the L*a*b* color space.

3. The pressure-sensitive adhesive film according to claim 1, wherein the first layer forms a front face of the resin film, and the first layer the laser beam-absorbing agent is carbon black.

4. The pressure-sensitive adhesive film according to claim 1, wherein the resin film has a front face positioned on the pressure-sensitive adhesive layer side and a back face positioned opposite to the front face, the front face having a lightness L* of 50 or lower, the back face having a lightness L* of 40 or higher, wherein the lightness L* is defined by the L*a*b* color space.

5. The pressure-sensitive adhesive film according to claim 1, wherein the resin film has a front face positioned on the pressure-sensitive adhesive layer side and a back face positioned opposite to the front face, the front face having a lightness L* of 25 or lower, the back face having a lightness L* of 65 or higher, wherein the lightness L* is defined by the L*a*b* color space.

6. The pressure-sensitive adhesive film according to claim 1, wherein each layer constituting the resin film comprises a resin component, with the resin component being a polyolefin resin or a polyester resin.

7. The pressure-sensitive adhesive film according to claim 1, wherein the front face and the back face differing in the lightness L* by 20 or larger, wherein the lightness L* is defined by the L*a*b* color space.

8. The pressure-sensitive adhesive film according to claim 1, wherein the black-based laser beam-absorbing agent is carbon black having an average particle diameter of 10 nm to 500 nm.

9. The pressure-sensitive adhesive film according to claim 1, wherein the white-based laser beam-absorbing agent is at least one selected from the group consisting of calcium carbonate, silica, alumina, titanium oxide, talc, clay, aluminum silicate, basic lead carbonate, zinc oxide, strontium titanate, barium sulfate, and calcium sulfate.

10. The pressure-sensitive adhesive film according to claim 1, wherein the white-based laser beam-absorbing agent is at least one selected from the group consisting of calcium carbonate, silica, and titanium oxide.

11. The pressure-sensitive adhesive film according to claim 1, wherein the white-based laser beam-absorbing agent has an average particle diameter of 0.01 μm to 5 μm.

12. The pressure-sensitive adhesive film according to claim 1, wherein the white-based laser beam-absorbing agent has an average particle diameter of 0.01 μm to 5 μm, and the white-based laser beam-absorbing agent is at least one selected from the group consisting of calcium carbonate, silica, and titanium oxide.

13. The pressure-sensitive adhesive film according to claim 1, wherein the black-based laser beam-absorbing agent is carbon black having an average particle diameter of 10 nm to 500 nm, and the white-based laser beam-absorbing agent has an average particle diameter of 0.01 μm to 5 μm, and the white-based laser beam-absorbing agent is at least one selected from the group consisting of calcium carbonate, silica, and titanium oxide.

14. The pressure-sensitive adhesive film according to claim 1, wherein the second layer contains an organic compound which is a laser beam-absorbing agent different from a black-based laser beam-absorbing agent and a white-based laser beam-absorbing agent, and the organic compound is at least one selected from the group consisting of a quaterrylene-based compound, a perylene-based compound, a phthalocyanine-based compound, a cyanine-based compound, an aminium-based compound, a naphtalocyanine-based compound, a naphthoquinone-based compound, a diimonium-based compound, an anthraquinone-based compound, and an aromatic dithiol-based metal complex.

15. The pressure-sensitive adhesive film according to claim 1, wherein the second layer contains an organic compound which is a laser beam-absorbing agent different from a black-based laser beam-absorbing agent and a white-based laser beam-absorbing agent, and the organic compound is an organic quaterrylene bisimide.

16. The pressure-sensitive adhesive film according to claim 1, wherein the first layer is thicker than the second layer, and the thickness of the second layer is 25 μm or smaller.

17. The pressure-sensitive adhesive film according to claim 1, wherein the pressure-sensitive adhesive layer comprises at least one polymer selected from the group consisting of natural rubber, polybutadiene, polyisoprene, butyl rubber, styrene-butadiene-styrene block copolymer, styrene-ethylene/butylene-styrene block copolymer, styrene-ethylene/butylene random copolymer, ethylene propylene rubber, propylene butene rubber, and ethylene propylene butene rubber.

18. A pressure-sensitive adhesive film capable of being cut with a laser beam having a center wavelength of 1000 nm to 1100 nm, the pressure-sensitive adhesive film comprising:
   a resin film as a substrate, the resin film having a front face and a back face positioned opposite to the front face, the resin film having a bi-layer constitution consisting of a first layer constituting the first face and a second layer constituting the second face; and
   a pressure-sensitive adhesive layer provided on the front face of the resin film, wherein
   the resin film has a laser beam reflectance of 5% or higher, but 40% or lower in a wavelength range of 1000 nm to 1100 nm, and has a laser beam transmittance of 5% or lower in the wavelength range,
   the front face of the resin film has a lightness L* of 25 or lower, the back face of the resin film has a lightness L* of 65 or higher, and the front face and the back face of the resin film differ in the lightness L* by 20 or larger, wherein the lightness L* is defined by the L*a*b* color space,
   each layer constituting the resin film comprises a resin component, with the resin component being a polyolefin resin or a polyester resin,
   the first layer contains as a black-based laser beam-absorbing agent a carbon black having an average particle diameter of 10 nm to 500 nm,
   the second layer contains at least one white-based laser beam-absorbing agent selected from the group consisting of calcium carbonate, silica, and titanium oxide, the white-based laser beam-absorbing agent having an average particle diameter of 0.01 μm to 5 μm,
   the second layer further contains an organic compound which is a laser beam-absorbing agent different from the black-based laser beam-absorbing agent and the white-based laser beam-absorbing agent, the organic compound being an organic quaterrylene bisimide,
   the first layer is thicker than the second layer, and the thickness of the second layer is 25 μm or smaller, and
   the pressure-sensitive adhesive layer comprises at least one polymer selected from the group consisting of natural rubber, polybutadiene, polyisoprene, butyl rubber, styrene-butadiene-styrene block copolymer, styrene-ethylene/butylene-styrene block copolymer, styrene-ethylene/butylene random copolymer, ethylene propylene rubber, propylene butene rubber, and ethylene propylene butene rubber.

* * * * *